US012614398B2

(12) United States Patent
Choi et al.

(10) Patent No.: US 12,614,398 B2
(45) Date of Patent: Apr. 28, 2026

(54) METHOD AND DEVICE WITH ROAD SURFACE RECOGNITION

(71) Applicant: SAMSUNG ELECTRONICS CO., LTD., Suwon-si (KR)

(72) Inventors: Ho-Ik Choi, Suwon-si (KR); Jahoo Koo, Suwon-si (KR); Youngwan Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 18/305,802

(22) Filed: Apr. 24, 2023

(65) Prior Publication Data

US 2024/0177497 A1 May 30, 2024

(30) Foreign Application Priority Data

Nov. 29, 2022 (KR) ......................... 10-2022-0162526

(51) Int. Cl.
| | |
|---|---|
| *G06K 9/00* | (2022.01) |
| *G06T 7/70* | (2017.01) |
| *G06V 20/56* | (2022.01) |

(52) U.S. Cl.
CPC .............. *G06V 20/588* (2022.01); *G06T 7/70* (2017.01); *G06T 2207/20081* (2013.01); *G06T 2207/30256* (2013.01)

(58) Field of Classification Search
CPC .................................................. G06V 20/588
See application file for complete search history.

(56) References Cited

U.S. PATENT DOCUMENTS 9,449,227 B2 * 9/2016 Chen ...................... G06V 20/13
10,816,993 B1 * 10/2020 Tran ..................... G05D 1/0246
(Continued)

FOREIGN PATENT DOCUMENTS

KR 10-2228278 B1 3/2021
KR 10-2363719 B1 2/2022
(Continued)

OTHER PUBLICATIONS

Yao, Lianbi, et al. "Automatic extraction of road markings from mobile laser-point cloud using intensity data." The International Archives of the Photogrammetry, Remote Sensing and Spatial Information Sciences 42 (2018): 2113-2119. (Year: 2018).*

*Primary Examiner* — Hadi Akhavannik
(74) *Attorney, Agent, or Firm* — NSIP Law

(57) ABSTRACT

A method performed by one or more processors includes: obtaining an original intensity map including original elements having respective signal intensities with respect to a road surface, the signal intensities based on sensing of a vision sensor arranged on a moving object that is moving on a road including the road surface, wherein each of the original elements has a respective local neighborhood of neighboring original elements; generating a local intensity map by determining local values respectively corresponding to the original elements of the original intensity map, wherein the local values are determined based on the original elements in the respectively corresponding local neighborhoods; generating a normalized intensity map by normalizing the original intensity map based on the local intensity map; and recognizing the road surface based on the normalized intensity map.

18 Claims, 8 Drawing Sheets

(56)  References Cited

U.S. PATENT DOCUMENTS

| | | | | |
|---|---|---|---|---|
| 10,949,997 | B2 * | 3/2021 | Houts | G06V 10/764 |
| 2010/0114416 | A1 * | 5/2010 | Au | G05D 1/027 |
| | | | | 701/23 |
| 2011/0249867 | A1 * | 10/2011 | Haas | G06V 10/7747 |
| | | | | 382/103 |
| 2013/0011016 | A1 * | 1/2013 | Haas | G06V 10/7747 |
| | | | | 382/103 |
| 2015/0202770 | A1 * | 7/2015 | Patron | G06Q 50/01 |
| | | | | 901/50 |
| 2018/0033160 | A1 * | 2/2018 | Ishigami | G01C 15/00 |
| 2018/0335787 | A1 * | 11/2018 | Zeng | B60W 30/12 |
| 2019/0018989 | A1 * | 1/2019 | Kovarik | G06K 7/10376 |
| 2019/0385336 | A1 * | 12/2019 | Houts | G06T 7/11 |
| 2020/0098135 | A1 * | 3/2020 | Ganjineh | G01C 21/3811 |
| 2020/0200547 | A1 * | 6/2020 | Miller | G01C 21/3874 |
| 2022/0214428 | A1 | 7/2022 | Retterath et al. | |

FOREIGN PATENT DOCUMENTS

| | | |
|---|---|---|
| KR | 10-2367138 B1 | 2/2022 |
| KR | 10-2022-0085286 A | 6/2022 |
| WO | WO 2022/075607 A1 | 4/2022 |

* cited by examiner

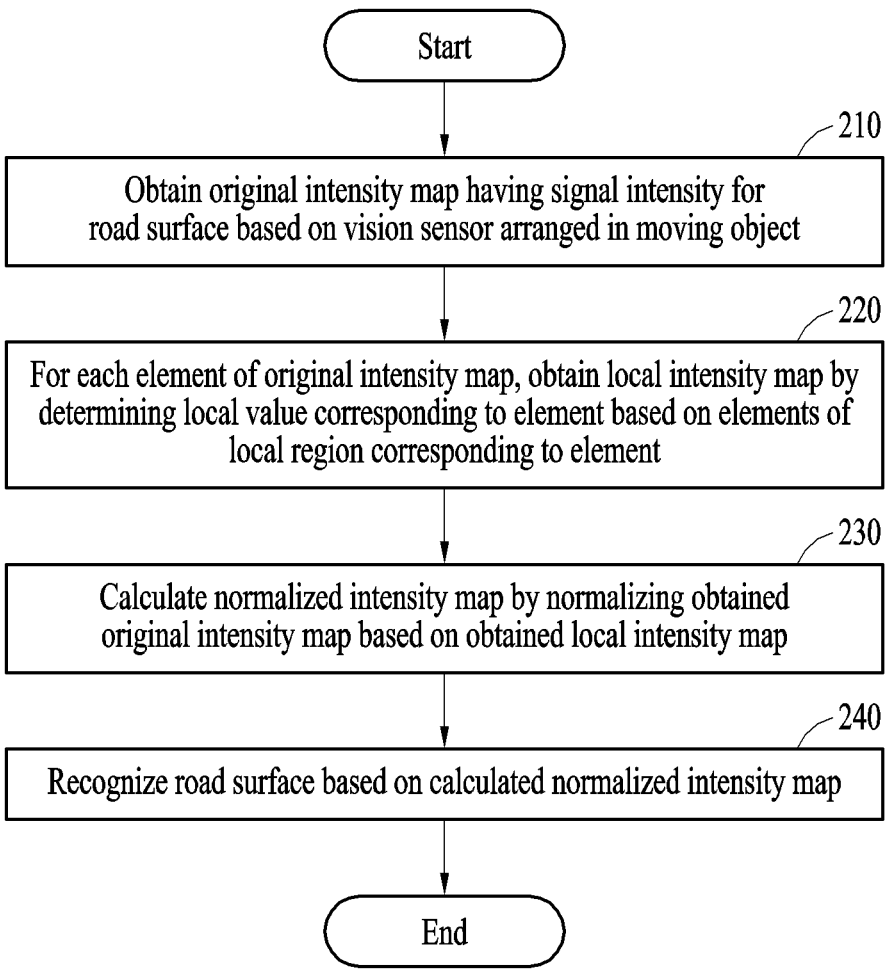

Start

210

Obtain original intensity map having signal intensity for road surface based on vision sensor arranged in moving object

220

For each element of original intensity map, obtain local intensity map by determining local value corresponding to element based on elements of local region corresponding to element

230

Calculate normalized intensity map by normalizing obtained original intensity map based on obtained local intensity map

240

Recognize road surface based on calculated normalized intensity map

End

FIG. 2

From 210

To 240

METHOD AND DEVICE WITH ROAD SURFACE RECOGNITION

CROSS-REFERENCE TO RELATED APPLICATIONS

This application claims the benefit under 35 USC § 119(a) of Korean Patent Application No. 10-2022-0162526, filed on Nov. 29, 2022, in the Korean Intellectual Property Office, the entire disclosure of which is incorporated herein by reference for all purposes.

BACKGROUND

1. Field

The following description relates to road surface recognition.

2. Description of Related Art

Recently, with the development of the automobile industry and an increasing demand for safety functions, research on advanced driver assistance systems (ADAS) has been actively conducted.

One of the most spotlighted research areas in ADAS is a lane keeping assistance system (LKAS) that may detect a currently driving lane, identify lane-escape information, and control lane-escape prevention. While driving, a driver may need to take hands off the steering wheel to control an air conditioning button or due to an external factor, and this may cause a serious accident. Thus, the LKAS is one of the most essential ADAS features.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method performed by one or more processors includes: obtaining an original intensity map including original elements having respective signal intensities with respect to a road surface, the signal intensities based on sensing of a vision sensor arranged on a moving object that is moving on a road including the road surface, wherein each of the original elements has a respective local neighborhood of neighboring original elements; generating a local intensity map by determining local values respectively corresponding to the original elements of the original intensity map, wherein the local values are determined based on the original elements in the respectively corresponding local neighborhoods; generating a normalized intensity map by normalizing the original intensity map based on the local intensity map; and recognizing the road surface based on the normalized intensity map.

The obtaining of the original intensity map may include: based on sensing data on the road surface having unit regions, generating the original intensity map, wherein the signal intensities respectively correspond to the unit regions of the road surface.

The local neighborhoods respectively corresponding to the original elements of the original intensity map may be determined based on a distance from an original element to neighboring original elements.

The generating of the local intensity map may include calculating a local value of a local neighborhood based on a number original elements therein that are determined to be valid and/or based on an element value of an original element therein that is determined to be valid.

The obtaining the local intensity map may include calculating a local value by an average of element values of valid elements among elements of the local region.

The generating the normalized intensity map may include normalizing an original element of the original intensity map based on a ratio of an element value of the element to a local value corresponding to the original element.

The recognizing of the road surface may include detecting a road surface marking by comparing the calculated normalized intensity map to a threshold.

The obtaining of the original intensity map may include extracting sensing data on the road surface from sensing data generated by the vision sensor by applying a machine learning model to the sensing data.

The obtaining of the original intensity map may include, when receiving additional sensing data, updating the original intensity map based on the additional sensing data.

The method may further include detecting at least one of a lane line and a crosswalk based on the recognizing of the road surface.

The method may further include calculating movement information of the moving object between a first time point and a second time point based on a match between a first recognition result at the first time point and a second recognition result at the second time point.

The original intensity map may be obtained by mapping three-dimensional points in a point cloud to the original elements.

In another general aspect, a device for recognizing a road surface includes one or more processors and memory storing instructions configured to, when executed by the one or more processors, cause the one or more processors to: obtain an original intensity map including original elements having respective signal intensities with respect to a road surface, the signal intensities based on sensing of a vision sensor arranged on a moving object, where each of the original elements has a respective local neighborhood of neighboring original elements, generate a local intensity map by determining local values respectively corresponding to the original elements of the original intensity map, where the local values are determined based on the original elements in the respectively corresponding local neighborhoods, generate a normalized intensity map by normalizing the original intensity map based on the local intensity map, and recognize the road surface based on the normalized intensity map.

The local neighborhood of an original element may be determined based on including therein original elements within a given distance of the original element.

The instructions may be further configured to cause the one or more processors to determine valid original elements in the local neighborhood, and compute a local value based the number of determined valid elements in the local neighborhood or an element value of a determined valid element.

The instructions may be further configured to cause the one or more processors to normalize an original element of the original intensity map to a ratio of an element value of the original element to a local value derived from the local neighborhood of the original element.

The instructions may be further configured to cause the one or more processors to detect a road surface marking by comparing the generated normalized intensity map to a threshold.

The instructions may be further configured to cause the one or more processors to, when receiving additional sensing data, update the original intensity map based on the additional sensing data.

The instructions may be further configured to cause the one or more processors to detect a lane line or a crosswalk based on the recognizing of the road surface.

The instructions may be further configured to cause the one or more processors to calculate movement information of the moving object between a first time point and a second time point based on a match between a first recognition result at the first time point and a second recognition result at the second time point.

Other features and aspects will be apparent from the following detailed description, the drawings, and the claims.

BRIEF DESCRIPTION OF THE DRAWINGS

FIG. 2 illustrates an example method of recognizing a road surface, according to one or more embodiments.

Figure 1:
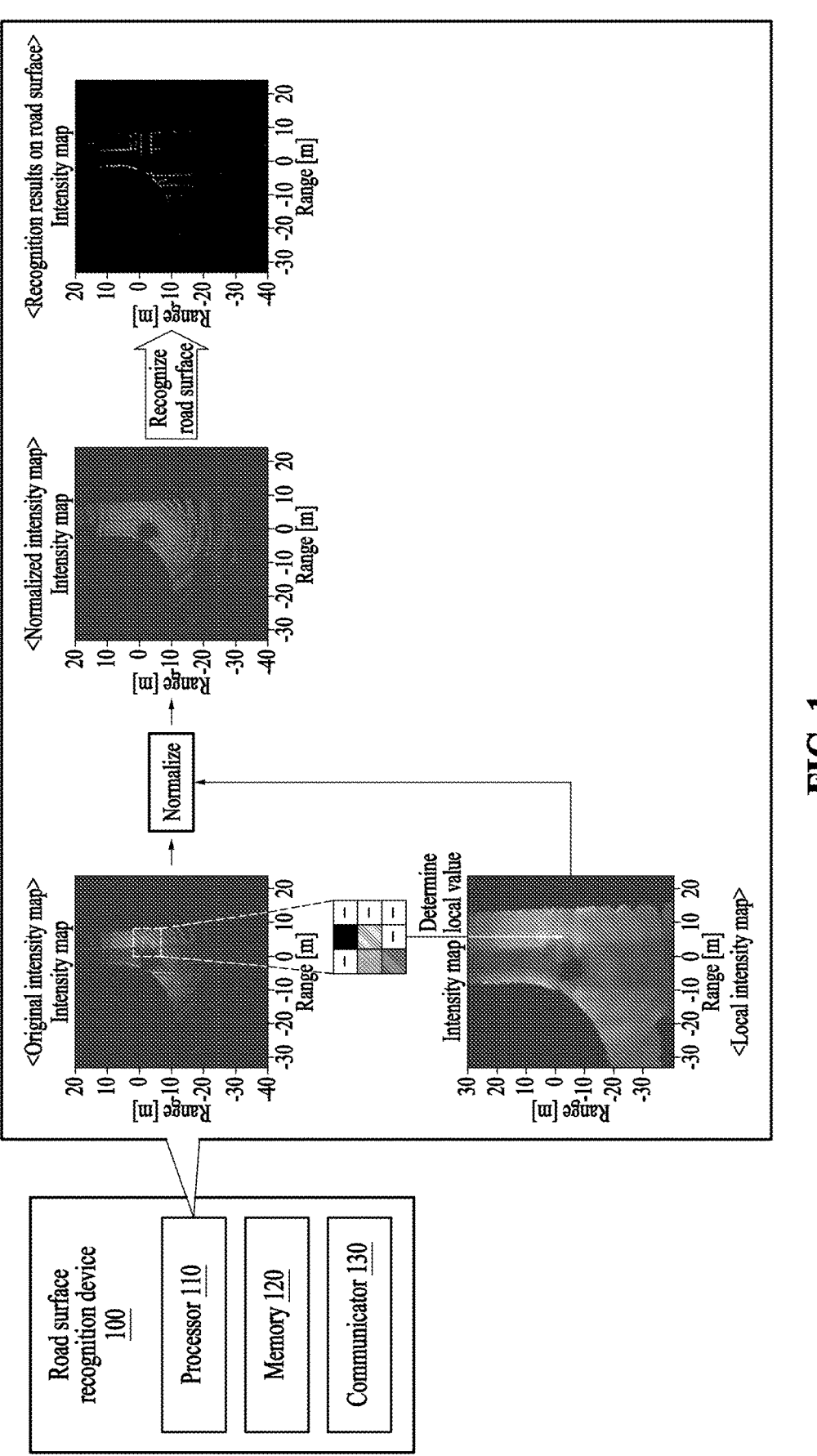
FIG. 1 illustrates an example road surface recognition device, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example road surface recognition device 100. According to an example, the road surface recognition device 100 may recognize a road surface around a moving object using a vision sensor. For example, the road surface recognition device 100 may recognize a road surface by processing sensing data obtained by a vision sensor. The road surface recognition device 100 may detect an object on a road. The road surface may include a region including a durable surface material to maintain vehicle traffic. The object on the road surface may include, for example, a road surface marking. The road surface marking may be a type of traffic safety sign and may refer to a marking in a letter or a symbol drawn on a road to convey information to a road user.

For example, the road surface recognition device 100 may obtain an original intensity map including a signal intensity of the road surface, based on sensing data obtained by the vision sensor. The road surface recognition device 100 may obtain, from the original intensity map, a local intensity map including a local value. The local value may be a value corresponding to each element of the original intensity map and may refer to a value related to a local region corresponding to each element. The road surface recognition device 100 may calculate a normalized intensity map based on the original intensity map and the local intensity map. The road surface recognition device 100 may recognize the road surface based on the normalized intensity map.

The moving object may be, for example, a vehicle. Herein, a vehicle is mainly described as an example of the moving object. However, the example is not limited thereto, and the moving object may be a motorcycle or a bicycle, an aircraft on a runway, etc.

The vision sensor may be arranged on the moving object. The vision sensor may collect information related to driving of the moving object. For example, the vision sensor may include at least one of a camera sensor, a radar sensor, a light detection and ranging (LiDAR) sensor, and an ultrasonic sensor. The camera sensor may generate image data as sensing data by sensing and receiving light (e.g., light in a visible band) reflected from a physical point (e.g., a point on an obstacle object). The radar sensor may generate radar data by radiating and receiving a radar signal. The LiDAR sensor may generate LiDAR data by radiating and receiving light. The ultrasonic sensor may generate ultrasonic data by radiating and receiving an ultrasonic wave.

However, the example is not limited thereto, and the vision sensor may collect various pieces of sensing data for driving. For example, the vision sensor may include a global navigation satellite system (GNSS) module for localization and an inertial measurement unit (IMU) module for motion estimation of a moving object. The road surface recognition device 100 may determine a current position and a current motion (e.g., a velocity, an acceleration, an angular velocity, and a steering direction) of a moving object based on a GNSS signal and an IMU signal.

The road surface recognition device 100 in an example may include a processor 110, a memory 120, and a communicator 130.

The processor 110 may be configured to obtain an intensity map for recognizing a road surface and recognize the road surface based on the obtained intensity map. For example, the processor 110 may obtain at least one intensity map of an original intensity map, a local intensity map, or a normalized intensity map based on sensing data received from the vision sensor. The processor 110 may be configured to detect a road surface marking based on the obtained intensity map.

The memory 120 may temporarily and/or permanently store the original intensity map, the local intensity map, the normalized intensity map, or information (e.g., a threshold) related to recognition of the road surface. The memory 120 may store instructions to obtain the original intensity map, obtain the local intensity map, calculate the normalized intensity map, or recognize the road surface. However, these are only examples, and the information stored in the memory 120 is not limited thereto.

The communicator 130 may transmit/receive any one or any combination of sensing data, an intensity map (e.g., an original intensity map, a local intensity map, and a normalized intensity map), and a recognition result of a road surface. The communicator 130 may establish a wired communication channel and/or a wireless communication channel with an external device (e.g., an electronic device and a server), and may establish communication via a long-range communication network, such as cellular communication, short-range wireless communication, local area network (LAN) communication, Bluetooth™, wireless-fidelity (Wi-Fi) direct, or infrared data association (IrDA), a legacy cellular network, a fourth generation (4G) and/or 5G network, next-generation communication, the Internet, or a computer network (e.g., a LAN or a wide area network (WAN)).

FIG. 2 illustrates an example method of recognizing a road surface.

In operation 210, a road surface recognition device may obtain an original intensity map including a signal intensity of a road surface, based on a vision sensor arranged on a moving object.

The road surface recognition device may receive sensing data from the vision sensor. The sensing data may be data obtained by the vision sensor and may be data in a sensing range (e.g., a field of view (FOV)) of the vision sensor. The road surface recognition device may extract, from the sensing data, sensing data (e.g., road surface sensing data) of the road surface in the sensing range. The road surface recognition device may obtain an original intensity map including a signal intensity on the road surface, and may do so based on the extracted road surface sensing data. The sensing data and extraction of the road surface sensing data from the sensing data are described with reference to FIG. 3.

The original intensity map may include a plurality of elements (also referred to as original elements). The road surface sensing data may be divided into a plurality of unit regions, and each of the unit regions may be a region corresponding to one element of the original intensity map. Each element of the original intensity map may have, as an element value, a signal intensity of a unit region corresponding to the element. For example, the original intensity map may be implemented in a grid map and the plurality of elements of the original intensity map may be implemented in a plurality of grids of the grid map. Obtaining of the original intensity map based on the sensing data is described with reference to FIG. 3 and Equation 2.

According to an example, the original intensity map may be updated based on additional sensing data. Updating the original intensity map based on the additional sensing data is described with reference to FIG. 3.

In operation 220, for each element of the original intensity map, the road surface recognition device may obtain a local intensity map by determining a local value corresponding to the original element based on original elements of a local region (or neighborhood) corresponding to the element.

The local region may be at least a portion of the original intensity map. Local regions may be determined for each respectively corresponding original element of the original intensity map, and local values may be determined for (and from) each of the respective local regions. A local value may be a signal intensity of a corresponding local region and may be determined based on elements included in the corresponding local region. The local intensity map may include a plurality of elements. Each element of the local intensity map may have, as an element value, a local value corresponding to the original element (of the original intensity map) that corresponds to the element of the local intensity map. For example, each element of the local intensity map may correspond to an element of the original intensity map at the same map position.

The local regions may be determined based on the original elements of the original intensity map and each of the local regions may correspond to a respective original element (e.g., on a one-to-one basis). For example, a local region may be set as a peripheral (neighboring) region of the corresponding original element. The local value may be determined based on a statistical intensity value of the peripheral region of the corresponding element. Determination of the local regions and the local values is described with reference to FIGS. 4 and 5.

In operation 230, the road surface recognition device may calculate a normalized intensity map by normalizing the obtained original intensity map based on the obtained local intensity map. The normalized intensity map may include a plurality of normalized elements. Each element of the normalized intensity map may have, as an element value, a normalized value calculated based on a corresponding element of the original intensity map and a corresponding element of the local intensity map.

The normalized value may include a value representing an element value of each element of the original intensity map based on a local value of the element. For example, the normalized value may express a signal intensity of a unit region corresponding to each element of the original intensity map as a value relative to a local region of the element. The normalized value may represent a degree of signal intensity of a unit region relative to a local region. For example, when a signal intensity (e.g., a first local value) of a first local region corresponding to a first unit region is greater than a signal intensity (e.g., a second local value) of a second region corresponding to a second unit region, even though a first signal intensity of the first unit region is greater than a second signal intensity of the second unit region, a first normalized value (e.g., a value obtained by dividing the first signal intensity by the first local value) corresponding to the first unit region may be less than a second normalized value (e.g., a value obtained by dividing the second signal intensity by the second local value) of the second unit region.

For example, for each original element of the original intensity map, the road surface recognition device may determine its normalized value based on an element of the original intensity map and a corresponding element of the local intensity map. The road surface recognition device may determine a normalized value by normalizing an element value of an element of the original intensity map with an element value of a corresponding element of the local intensity map. Calculation of the normalized value and the normalized intensity map are described with reference to FIG. 4.

In operation 240, the road surface recognition device may recognize the road surface based on the calculated normalized intensity map. For example, the road surface recognition device may detect a road surface marking based on the calculated normalized intensity map.

According to an example, the road surface recognition device may detect a road surface marking by comparing the normalized intensity map to a threshold. For each element of the normalized intensity map, the road surface recognition device may compare an element value of the element to the threshold. For example, among the elements of the normalized intensity map, the road surface recognition device may determine an element having an element value exceeding the threshold to be an element corresponding to the road surface marking. Among the plurality of elements of the normalized intensity map, a set of elements having element values exceeding the threshold may be obtained as a recognition result. For example, the recognition result may include information (e.g., a position of an element in a normalized intensity map (or an original intensity map)) on an element corresponding to a road surface marking.

According to an example, the recognition result may include a plurality of elements. Each element of the recognition result may correspond to each unit region of the sensing data on the road surface. Each unit region may include a region corresponding to a road surface marking and a region corresponding to a road surface other than the road surface marking. Each element of the recognition result may indicate whether the unit region corresponding to the element corresponds to the road surface marking or another road surface. For example, when an element of the recognition result satisfies a predetermined condition (e.g., having a predetermined element value), the element (or a unit region corresponding to the element) may correspond to the road surface marking. When an element of the recognition result does not satisfy the predetermined condition, the element (or a unit region corresponding to the element) may correspond to road surface other than the road surface marking.

By using the normalized intensity map for recognizing a road surface, the road surface recognition device in an example may recognize a region having a strong signal intensity (e.g., having a normalized value exceeding a threshold) compared to the local region as a road surface marking rather than simply recognize a region having a strong (e.g., exceeding the threshold) signal intensity as the road surface marking. Even if a signal intensity for a long distance region is collected as a weak value and a signal intensity for a short distance region is collected as a strong value for the sensing data, the road surface recognition device in an example may more accurately recognize the road surface based on the normalized value that is a signal intensity for the local region.

Figure 3:
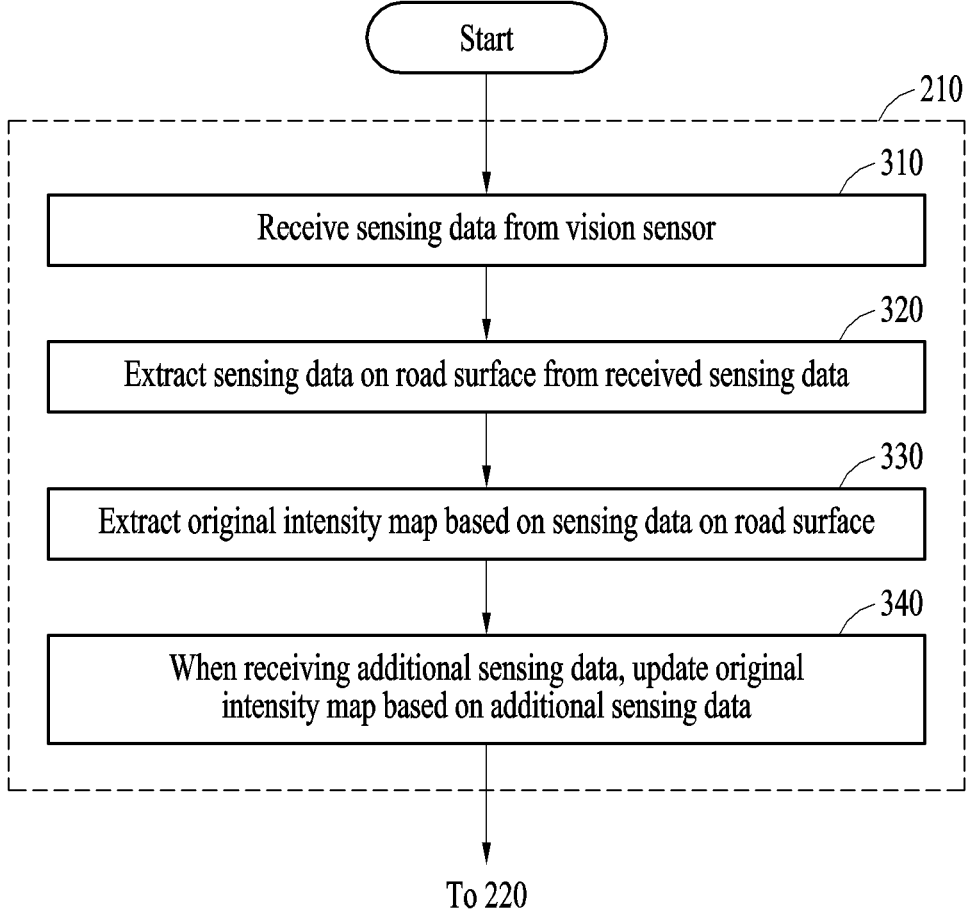
FIG. 3 illustrates an example operation of a road surface recognition device to obtain an original intensity map, according to one or more embodiments.

FIG. 3 illustrates an example operation of a road surface recognition device to obtain an original intensity map.

According to an example, the road surface recognition device may be configured to receive sensing data, extract road surface sensing data from the received sensing data, obtain an original intensity map based on the extracted road surface sensing data, and update the original intensity map based on received additional sensing data.

In operation 310, the road surface recognition device may receive sensing data from a vision sensor (described below). Alternatively, the sensing data may be synthesized or reconstructed from the sensing data of one or more vision sensors, predicted by one or more neural networks, etc.

According to an example, the sensing data may be in the form of a point cloud. Each point in the point cloud may include a position (e.g., an x-axis coordinate, a y-axis coordinate, and a z-axis coordinate) of the point and an intensity of a signal for the point.

For example, a point cloud P may be expressed as follows.

$$P_i = \{x_i, y_i, z_i, I_i\}, \; i=1, \ldots, N \qquad \text{Equation 1}$$

In this case, $P_i$ denotes an i-th point of the point cloud P, $x_i$ denotes an x coordinate of the i-th point, $y_i$ denotes a y coordinate of the i-th point, $z_i$ denotes a z coordinate of the i-th point, $I_i$ denote a sensed signal intensity of the i-th point, and N may denotes the number of points of the point cloud.

In operation 320, the road surface recognition device may extract sensing data of the road surface from the sensing data. That is, the sensing data of the road surface may be a subset of the sensing data that corresponds to the road surface. For example, the road surface recognition device may extract the sensing data of the road surface as sensing data within a region of interest (ROI). The ROI may be a region determined based on a current position of the moving object and may be a recognition range or extent of the road surface.

According to an example, the road surface recognition device may recognize and extract road surface sensing data by extracting points from the point cloud determined to correspond to the ground surface. For example, points having a z coordinate value of "0" (or a z coordinate value close to "0") may be extracted from the point cloud. Any means of identifying points that belong to the road surface may be used.

However, extraction of the road surface sensing data is not limited thereto, and the road surface sensing data may be extracted using a machine learning model, for example. The road surface recognition device may extract sensing data (e.g., the road surface sensing data) of the road surface from the received sensing data (point cloud) by applying a machine learning model to sensing data obtained by a vision sensor (e.g., a LIDAR sensor or a camera sensor). Such a model may be configured to use additional information, for example, map data indicating a path of the road, trajectory information of the moving object, additional sensor data, data received from other moving objects/vehicles, etc.

In operation 330, the road surface recognition device may obtain an original intensity map based on the extracted road surface sensing data. The road surface recognition device may determine each element of the original intensity map by performing a two-dimensional (2D) projection of the three-dimensional (3D) road surface sensing data to generate the original intensity map ("original" refers to data of a certain procedural phase and does not imply any particular quality of the data). For example, the original intensity map may be a grid map or image formed with a target resolution. A value of each element (e.g., pixel) of the original intensity map may be determined to be a signal intensity of a corresponding 3D point in the road surface sensing data projected to the element among the points of the road surface sensing data. Upscaling, downscaling, "hole filling" (e.g., by interpolation or inference), and other operations may also be performed. Regarding the projection, an original intensity map G may be expressed as follows.

$$G(n,m) = I_i, \; \text{if } x_0 + n \cdot \Delta x < x_i \leq x_0 + (n+1) \cdot \Delta x \text{ and }$$
$$y_0 + m \cdot \Delta y < y_i \leq y_0 + (m+1) \cdot \Delta y \qquad \text{Equation 2}$$

In Equation 2, variables other than n and m may be as noted above with reference to Equation 1. The term G (n, m) denotes an element of an original intensity map at coordinates (n, m) based on the x-axis and the y-axis, $x_0$ and $y_0$ respectively denote an x coordinate and a y coordinate of a reference position (e.g., a position on the road surface), and $\Delta x$ and $\Delta y$ may respectively denote target resolutions on the x-axis and the y-axis. To summarize, Equation 2 may be used to map intensities at 3D positions of the road surface sensing data to intensities of 2D positions of the original intensity map according to the target resolution of the original intensity map.

In operation 340, when the road surface recognition device receives additional sensing data, the road surface recognition device may update the original intensity map based on the received additional sensing data.

The road surface recognition device may obtain or generate the original intensity map based on first sensing data of a first time point. The road surface recognition device may receive additional sensing data of a second (later) time point and update the original intensity map by accumulating the additional original intensity map to the original intensity map, as described next.

As noted, in some implementations the road surface recognition device may update the original intensity map with the additional original intensity map based on movement information of the moving object.

According to an example, a position and a sensing direction of the vision sensor may vary change with movement of the moving object (or independently, in the case of articulated vision sensors). The movement of the moving object may include translation and rotation. The vision sensor arranged in (or affixed to) the moving object may be arranged on the front, rear, side, top, or bottom surface of the moving object. For example, the vision sensor may be arranged on the top surface of the moving object and may have a sensing direction point in front of the moving object. However, the placement and sensing direction of the sensor are not limited thereto and may vary depending on configuration of the sensor and/or the moving object. Because the vision sensor arranged on the moving object moves in tandem with the movement of the moving object, it may be understood that movement of the moving object corresponds to movement of the vision sensor.

The sensing data obtained by the vision sensor may have a coordinate system determined based on the position and the sensing direction of the vision sensor at a time point corresponding to the sensing of the sensing data. When the moving object moves, pieces of sensing data sensed for respective sampling time points may have different coordinate systems. For example, the first sensing data on the first time point may have a coordinate system that is different from the coordinate system of the second sensing data on the second time point. The road surface recognition device may use movement information of the moving object to update, based on the second sensing data, the original intensity map that is obtained based on the first sensing data. The movement information of the moving object may include a translation matrix and a rotation matrix as information on translation and rotation of the moving object.

The road surface recognition device may receive the first sensing data on the first time point and may obtain the original intensity map based on the first sensing data. The road surface recognition device may receive the movement information of the moving object and the additional sensing data on the second time point. As noted, the movement information may be information on translation and rotation of the moving object (or the vision sensor) and may include, for example, a translation matrix and a rotation matrix representing movement of the moving object from the first time point to the second time point. The road surface recognition device may update the original intensity map based on the additional sensing data and the movement information of the moving object. For example, the road surface recognition device may convert the original intensity map based on the movement information (e.g., the translation matrix or the rotation matrix) of the moving object. The road surface recognition device may update the original intensity map by accumulating the additional original intensity map, which is obtained based on the additional sensing data, to the converted original intensity map. Accumulation is described below.

For example, the road surface recognition device may obtain an original intensity map $G_k$ based on sensing data on a first time point $t_k$. The road surface recognition device may obtain an original intensity map $G_{k+1}$ on the second time point $t_{k+1}$ by updating the original intensity map $G_k$ based on additional sensing data on the second time point $t_{k+1}$. The $t_k$ original data is transformed to match the $t_{k+1}$ movement/translation and its data is combined with the additional data sensed at time $t_{k+1}$. The road surface recognition device may obtain additional original intensity map $$G_{k+1}^{add}$$

based on the additional sensing data on the second time point $t_{k+1}$. The road surface recognition device may convert the original intensity map $G_k$ on the first time point $t_k$ to converted original intensity map $G'_{k+1}$ related to the second time point $t_{k+1}$. The road surface recognition device may obtain the original intensity map $G_{k+1}$ on the second time point $t_{k+1}$ based on the additional original intensity map $$G_{k+1}^{add}$$

and the converted original intensity map $G'_{k+1}$ through the equation shown below.

$$G_{k+1}(n, m) = G'_{k+1}(n, \ m) + G_{k+1}^{add}(n, m) \qquad \text{Equation 3}$$

$$G'_{k+1}(n, m) = R \times G_k(n, m) + T \qquad \text{Equation 4}$$

In this case, R may denote a rotation matrix, T may denote a translation matrix, and x may denote a matrix multiplication.

Figure 4:
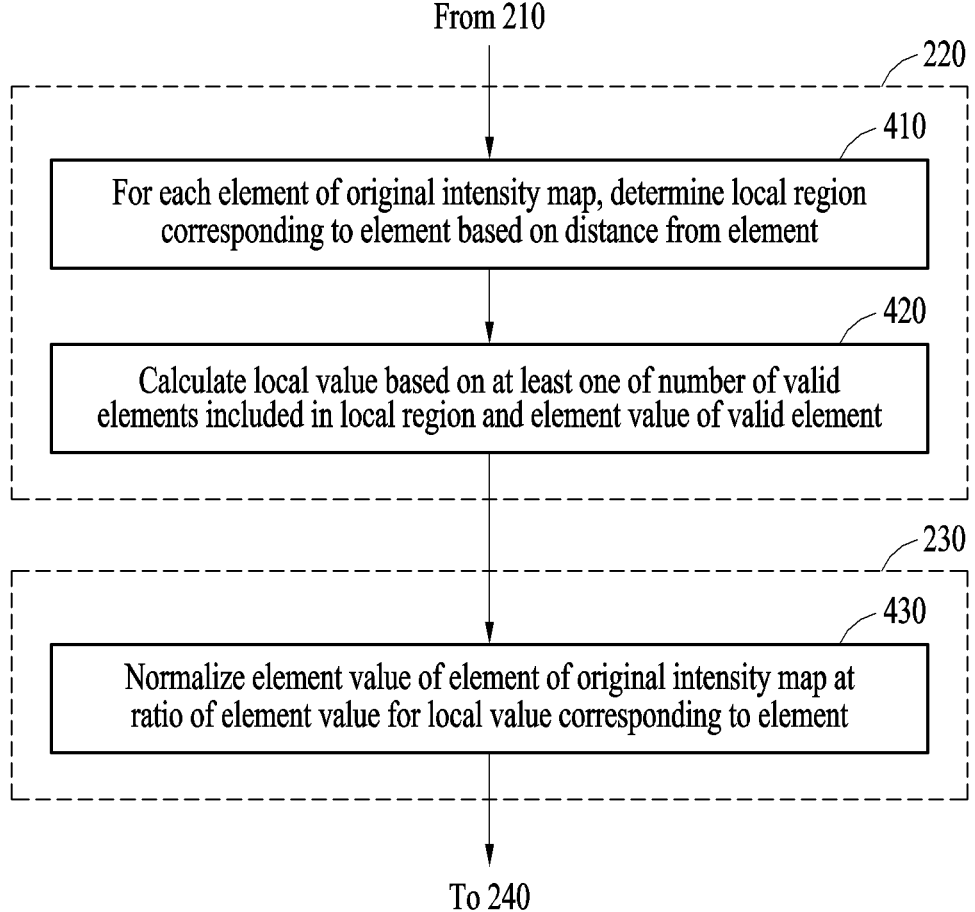
FIG. 4 illustrates example operations of a road surface recognition device to obtain a local intensity map and calculate a normalized intensity map, according to one or more embodiments.
Figure 5:
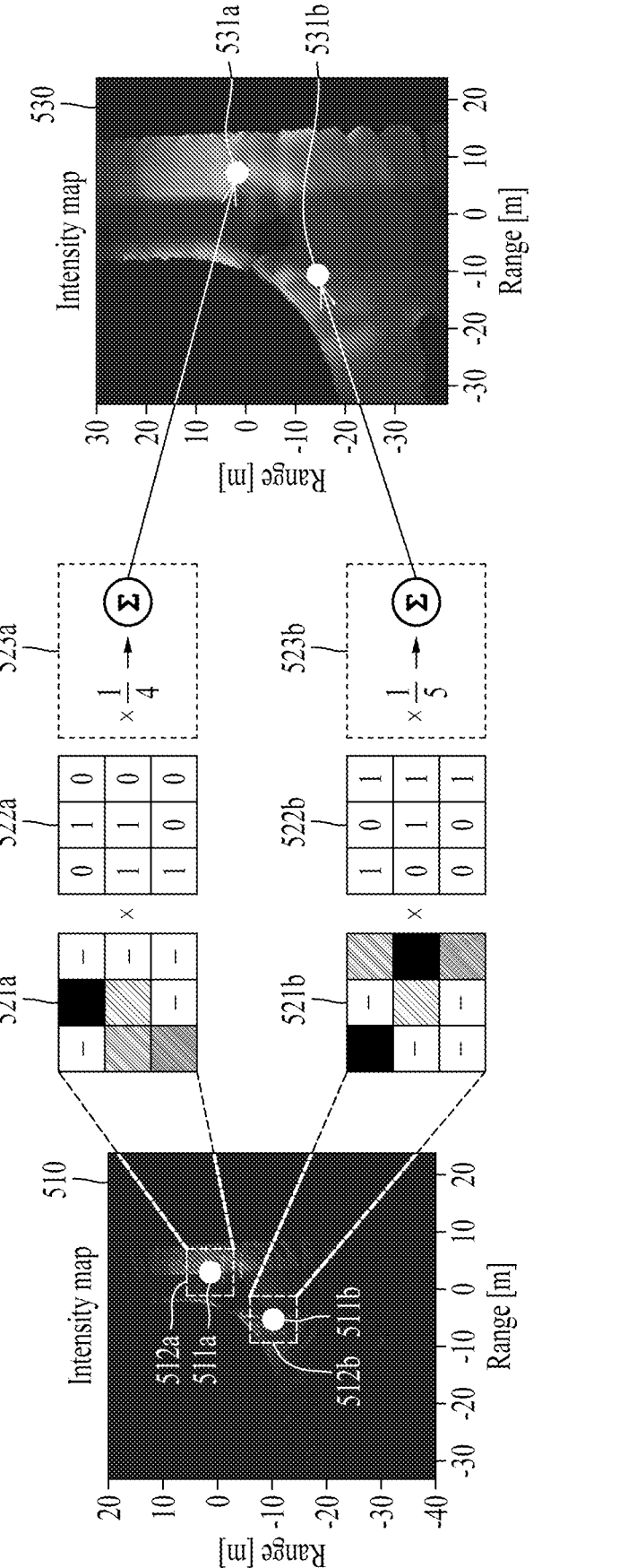
FIG. 5 illustrates an example operation of obtaining a local intensity map based on an original intensity map, according to one or more embodiments.

FIG. 4 illustrates example operations of a road surface recognition device to obtain a local intensity map and calculate a normalized intensity map. FIG. 5 illustrates an example of an operation of obtaining a local intensity map based on an original intensity map.

According to an example, the road surface recognition device may determine (define) local regions (or neighborhoods) of respectively corresponding elements of an original intensity map, may calculate local values (of a local intensity map) based on the respective local regions, and may normalize the original intensity map based on the local intensity map.

In operation 410, for each element of the original intensity map, the road surface recognition device may determine a local region or neighborhood corresponding to the element.

According to an example, a local region corresponding to an element may be determined based on a distance from the element of the original intensity map. For each element of the original intensity map, the road surface recognition device may determine a corresponding local region to be a region including any elements within a threshold distance of the element. A distance between two elements may be determined based on positions of the elements in the original intensity map. For example, when the original intensity map is in the form of a grid map (a map of grids), a local region of each element (e.g., each grid) may be determined based on a distance between coordinates of the corresponding element (e.g., the corresponding grid) and coordinates of other elements (e.g., other grids).

According to an example, for each element of the original intensity map, the road surface recognition device may determine a local region in a determined shape. The local region corresponding to an element may have a shape determined based on the position of the element. For example, the shape of the local region may be a predetermined figure (e.g., a square, a rectangle, a cross shape, etc.). In another example, the shapes of the local regions may be independently determined for each element of the original intensity map.

In operation 420, the road surface recognition device may obtain the local intensity map by determining a local value based on an element value of the local region.

The local value of a location region may be computed based on the number of valid elements included in the local region and an element value of a valid element therein. For example, for an element of the original intensity map, the road surface recognition device may calculate a local value as an average of element values of valid elements in the local region. The validity of an element may be determined based on its value. For example, when an element has a value exceeding a threshold (e.g., zero), the element may be valid. The threshold of validity of an element may be determined based on a characteristic of the vision sensor. For example, the threshold of validity of an element may be a lower bound (e.g., 0) of an available sensing range (e.g., 0 to 50) of the vision sensor. For example, the threshold of validity may be determined to be a value (e.g., 5) based on a predetermined ratio (e.g., 0.1) to an available sensing range (e.g., 0 to 50) of the vision sensor. The available sensing range may represent a signal intensity that is able to be sensed by the vision sensor. In other words, some elements may be excluded from computing local values for the respective local regions when their value is not within (or close to) a valid value sensing range.

The road surface recognition device may obtain the local intensity map by performing the determination of local values for each the elements of the original intensity map. An element of the local intensity map may correspond to an element of the original intensity map, but with an element value (e.g., a local value) of the local intensity map. An element of the local intensity map may have the same position as an element of the original intensity map corresponding to the element. For example, a local value of an element at coordinates (1, 2) of the original intensity map may be determined to be an element value at coordinates (1, 2) of the local intensity map. To summarize, the local intensity map may be formed by replacing values of the original intensity map with respective local values of their respective local regions/neighborhoods.

FIG. 5 shows an example of a local intensity map 530 obtained from an original intensity map 510. The road surface recognition device may determine a local value based on a local region of an element of the original intensity map 510, and may do so for each of the elements/regions in the original intensity map 510. The road surface recognition device may determine the local value of a local region based on values of elements included in the local region that are determined to be valid.

For example, the road surface recognition device may determine a first local region 512a corresponding to a first element 511a of the original intensity map 510. A local value may be determined based on valid elements in the first local region 512a. A first local map 521a may include element values of the first local region 512a. In a local map, a dash (e.g., "-") represents an element value of an invalid (or disregarded) element, a colored element represents a valid element and a brightness thereof represents a color or intensity of an element value of the element. A first validity filter 522a corresponding to the first local region 512a indicates validity of each element of the first local region 512a. Element-wise multiplication may be performed on the first local map 521a and the first valid filter 522a. In operation 523a, an average of valid element values of the first local region 512a may be calculated by adding multiplication results (Σ in FIG. 5) and dividing the addition result by the number of valid elements (e.g., 4). The road surface recognition device may determine the calculated average to be the local value of the first element 511a. The road surface recognition device may determine the local value for the first element 511a to be an element value of a first element 531a of the local intensity map 530 (the first element 531a corresponding to the first element 511a).

Continuing the example of FIG. 5, the road surface recognition device may determine a second local region 512b corresponding to a second element 511b of the original intensity map 510. The road surface recognition device may determine a local value based on valid elements among elements of the second local region 512b. A second local map 521b may include element values of the second local region 512b. A second validity filter 522b corresponding to the second local region 512b may indicate validity of each element of the second local region. Element-wise multiplication may be performed on the second local map 521b and the second valid filter 522b. In operation 523b, an average of valid element values of the second local region 512b may be calculated by adding multiplication results (expressed as Σ in FIG. 5) and dividing by the number of valid elements (e.g., 5). The calculated average may be determined to be the local value of the second element 511b. The road surface recognition device may determine the local value for the second element 511b to be an element value of a second element 531b of the local intensity map 530 (the second element 531b corresponding to the second element 511b).

For example, when an available sensing range of the vision sensor is greater than or equal to 0 and a threshold of validity of an element is 0, the local intensity map $\tilde{G}$ may be calculated based on the equations shown below.

$$V(n, m) = \begin{cases} 1 & \text{if } G(n, m) \neq 0 \\ 0 & \text{else} \end{cases} \qquad \text{Equation 5}$$

$$J = \begin{bmatrix} 1 & \cdots & 1 \\ \vdots & \ddots & \vdots \\ 1 & \cdots & 1 \end{bmatrix} \qquad \text{Equation 6}$$

$$G' = G * J \qquad \text{Equation 7}$$

$$V' = V * J \qquad \text{Equation 8}$$

$$\tilde{G}(n, m) = \begin{cases} \dfrac{G'(n, m)}{V'(n, m)} & \text{if } V'(n, m) \neq 0 \\ 0 & \text{else} \end{cases} \qquad \text{Equation 9}$$

In this case, G denotes an original grid map, V denotes a validity filter indicating validity of each element of the original grid map, J denotes a filter for determining a local region, G' denotes a sum of element values of valid elements of the local region, and V' denotes the valid elements of the local region.

In operation 430, the road surface recognition device may normalize an element of the original intensity map at a ratio of an element value of the element of the original intensity map to a local value of the local intensity map. This may be performed for each of the elements of the original intensity map.

According to an example, for each element of the original intensity map, the road surface recognition device may normalize an element value based on a local value corresponding to the element. An element of the original intensity map may be normalized based on an element of the local intensity map at the same position as the element of the original intensity map. A normalized value may be obtained by dividing an element value of an element of the original intensity map by an element value of an element of the local intensity map. The road surface recognition device may calculate a normalized intensity map by repeating calculation of normalized values for the elements of the original intensity map.

An element of the normalized intensity map may correspond to an element of the original intensity map (or the local intensity map) used to calculate an element value (e.g., a normalized value) of the element. An element of the normalized intensity map may have the same position as an element of the original intensity map (or the local intensity map) corresponding to the element. For example, coordinates (1, 2) of the normalized intensity map may be calculated based on an element value at coordinates (1, 2) of the original intensity map and an element value at coordinates (1, 2) of the local intensity map.

Figure 6:
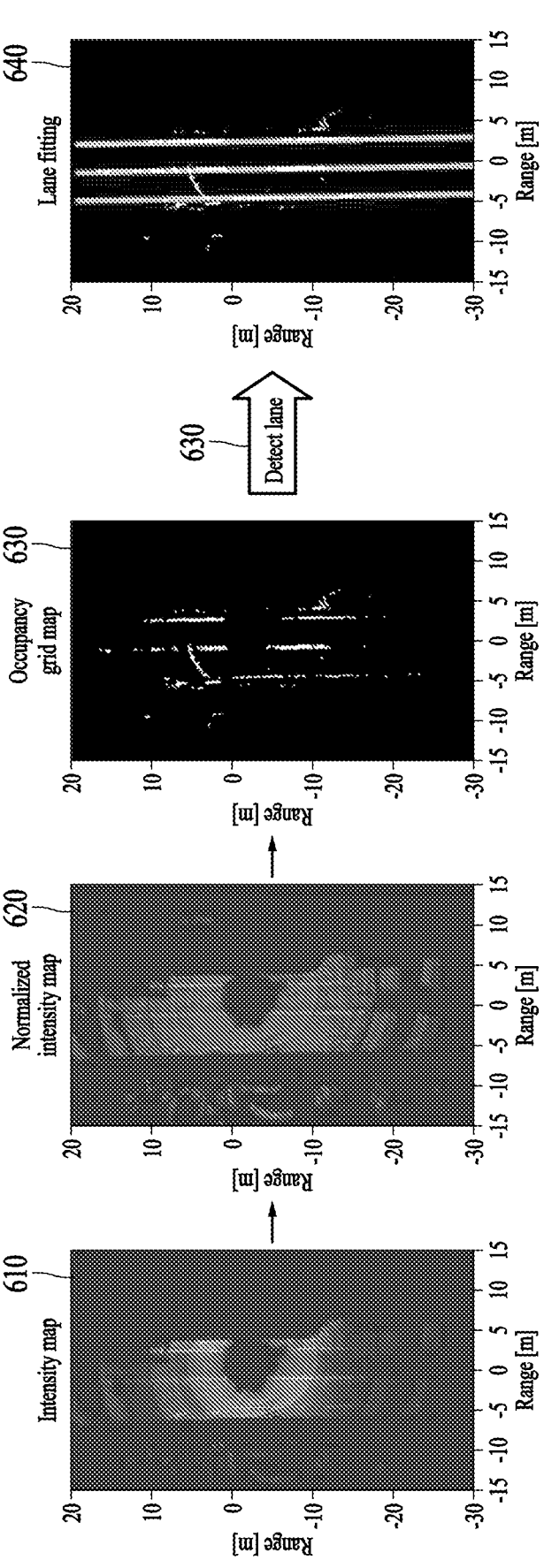
FIG. 6 illustrates an operation of detecting a lane line based on a recognition result of a road surface, according to one or more embodiments.

FIG. 6 illustrates an operation of detecting a lane line based on a recognition result of a road surface. The lane line detection may be based on a normalized intensity map of a road surface.

Herein, the road may be a roadway on which a vehicle drives and the road may include a lane. The lane may be divided or delineated by a lane line. The lane line may be a type of road surface marking and may be a line defining a lane. For example, the lane line may be a solid line or a dashed line painted on the road surface.

In FIG. 6, the road surface recognition device may obtain a recognition result 630 on a road surface based on a normalized intensity map 620 calculated by normalizing an original intensity map 610 using any of the techniques described above. Each element of the recognition result 630 may indicate whether the unit region corresponding to the element corresponds to road surface with marking or road surface without marking. For example, in the recognition result 630 of FIG. 6, elements (or unit regions corresponding to the elements) colored in white may correspond to a road surface marking and elements (or unit regions corresponding to the elements) colored in black may correspond to a road surface road surface marking.

The road surface recognition device may detect a lane line from the recognition result 630 using elements corresponding to road surface marking in the recognition result 630, and may do so based on a line fitting algorithm. For example, a lane line may be detected from the recognition result 630 using a Hough transform-based line fitting algorithm.

Figure 7:
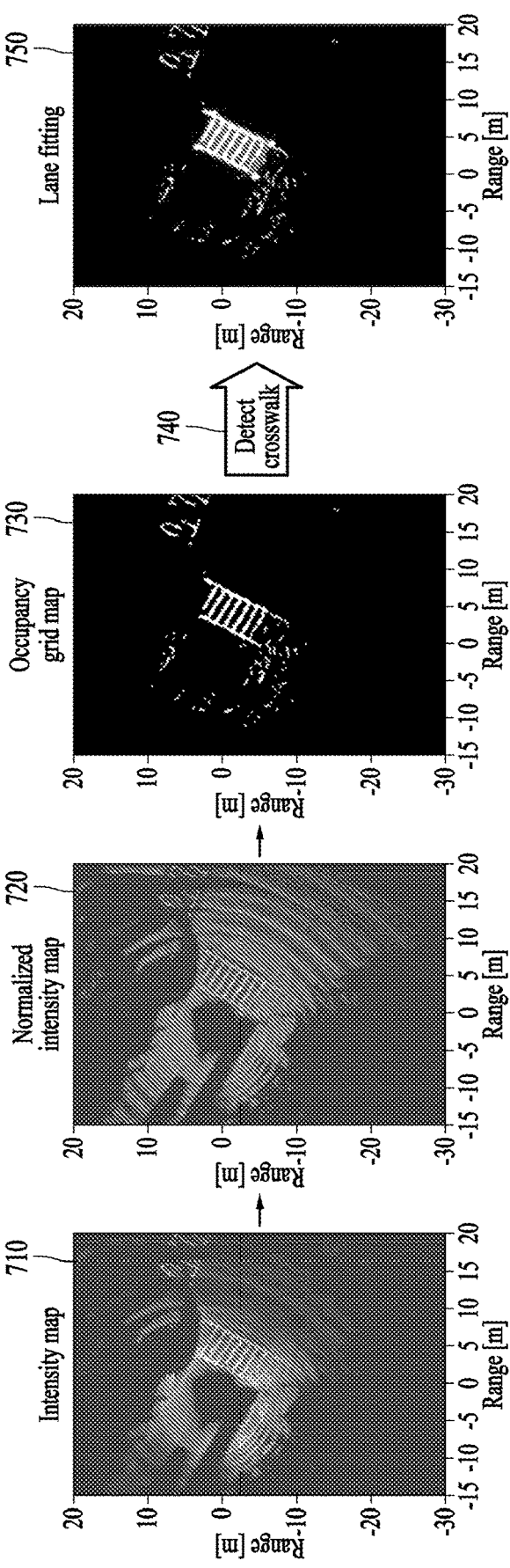
FIG. 7 illustrates an operation of detecting a crosswalk based on a recognition result of a road surface, according to one or more embodiments.

FIG. 7 illustrates an operation of detecting a crosswalk based on a recognition result of a road surface.

A road surface recognition device in an example may detect a crosswalk based on recognition of a road surface.

For the crosswalk, a road surface marking showing a crosswalk may be marked on a road surface corresponding to the crosswalk. The road surface recognition device may detect a road surface marking and may detect a crosswalk based on features of the detected road surface marking.

In FIG. 7, the road surface recognition device may obtain a recognition result 730 on a road surface based on a normalized intensity map 720 calculated by normalizing an original intensity map 710 (as described above). Each element of the recognition result 730 may indicate whether the unit region corresponding to the element corresponds to the road surface marking or a road surface without marking. For example, in the recognition result 730 of FIG. 7, elements colored in white may correspond to a road surface marking and elements colored in black may correspond to a road surface that is different from the road surface marking.

The road surface recognition device may detect a crosswalk from the recognition result 730. The road surface recognition device may detect a crosswalk (or a road surface marking indicating a crosswalk) using elements corresponding to a road surface marking of the recognition result 730 based on a contour or pattern detection algorithm. For example, the road surface recognition device may detect a rectangular region by applying the contour detection algorithm to the recognition result 730. A crosswalk may be detected by fitting the detected rectangular region.

Figure 8:
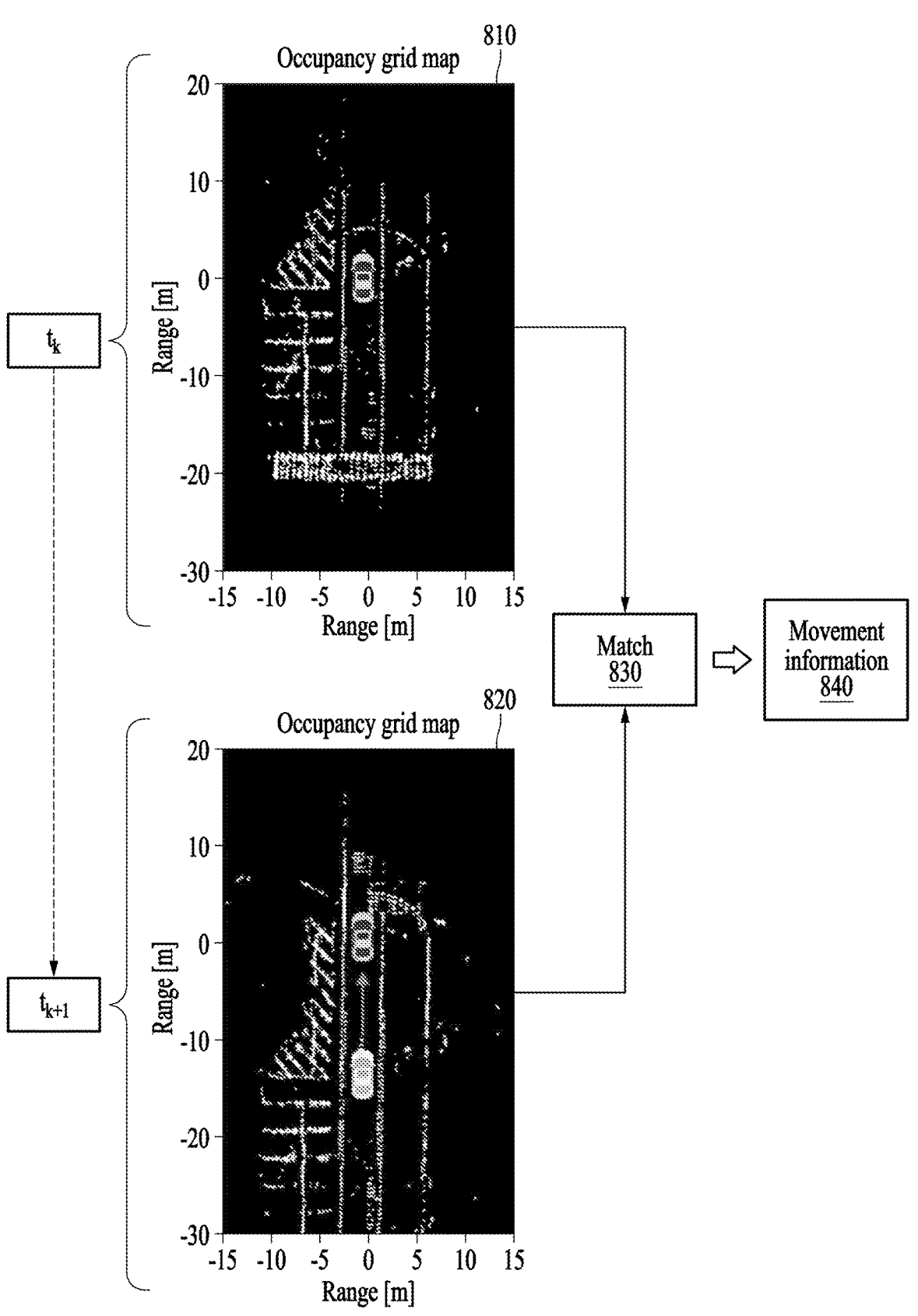
FIG. 8 illustrates an operation of determining movement information of a moving object based on a recognition result of a road surface, according to one or more embodiments.

FIG. 8 illustrates an operation of determining movement information of a moving object based on a recognition result of a road surface.

In FIG. 8, the road surface recognition device may obtain a first recognition result 810 based on sensing data on a first time point $t_k$. The road surface recognition device may obtain a second recognition result 820 based on sensing data on a second time point $t_{k+1}$. For example, in the first recognition result 810 and the second recognition result 820 of FIG. 8, elements colored in white may correspond to a road surface marking and elements colored in black may correspond to a road surface that is different from the road surface marking.

According to an example, the road surface recognition device may calculate movement information of a moving object based on a match between the first recognition result 810 and the second recognition result 820. For example, the road surface recognition device may calculate the movement information of the moving object by applying a matching algorithm to the first recognition result 810 and the second recognition result 820.

The movement information of the moving object may be information on movement of the moving object from the first time point $t_k$ to the second time point $t_{k+1}$ and may include, for example, a translation matrix and a rotation matrix. The translation matrix may represent a position change of the moving object and the rotation matrix may represent a direction change of the moving object. In other words, first movement information (which is used to update the original intensity map) and second movement information (which is derived by map matching) are independent of each other. For example, whether a first movement information is available or not, the second movement information can nonetheless be computed.

The computing apparatuses, the vehicles, the electronic devices, the processors, the memories, the image sensors, the vehicle/operation function hardware, the ADAS/LDAK systems, the displays, the information output system and hardware, the storage devices, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RW, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method performed by one or more processors, the method comprising:

obtaining an original intensity map comprising original elements having respective signal intensities with respect to a road surface, the signal intensities based on sensing of a vision sensor arranged on a moving object that is moving on a road including the road surface, wherein each of the original elements has a respective local neighborhood of neighboring original elements;

generating a local intensity map by determining local values respectively corresponding to the original elements of the original intensity map, wherein the local values are determined based on the original elements in the respectively corresponding local neighborhoods;

generating a normalized intensity map by normalizing the original intensity map based on the local intensity map; and performing recognition related to the road surface based on the normalized intensity map, wherein the method further comprises:

obtaining a first recognition result based on sensing data on a first time point;

obtaining a second recognition result based on sensing data on a second time point; and calculating movement information on movement of the moving object between the first time point and the second time point, based on a match between the first recognition result and the second recognition result, wherein the movement information includes translation information and rotation information.

2. The method of claim 1, wherein the obtaining of the original intensity map comprises:

based on sensing data on the road surface having unit regions, generating the original intensity map, wherein the signal intensities respectively correspond to the unit regions of the road surface.

3. The method of claim 1, wherein the local neighborhoods respectively corresponding to the original elements of the original intensity map are determined based on a distance from an original element to neighboring original elements.

4. The method of claim 1, wherein the generating of the local intensity map comprises calculating a local value of a local neighborhood based on a number of original elements therein that are determined to be valid and/or based on an element value of an original element therein that is determined to be valid.

5. The method of claim 1, wherein the generating of the local intensity map comprises calculating a local value by an average of element values of valid elements among elements of the local neighborhood.

6. The method of claim 1, wherein the generating of the normalized intensity map comprises normalizing an original element of the original intensity map based on a ratio of an element value of the element to a local value corresponding to the original element.

7. The method of claim 1, wherein the performing of the recognition related to of the road surface comprises detecting a road surface marking by comparing the calculated normalized intensity map to a threshold.

8. The method of claim 1, wherein the obtaining of the original intensity map comprises extracting sensing data on the road surface from sensing data generated by the vision sensor by applying a machine learning model to the sensing data.

9. The method of claim 1, further comprising, when receiving additional sensing data, updating the original intensity map based on the additional sensing data.

10. The method of claim 1, further comprising:
detecting at least one of a lane line and a crosswalk based on the recognition related to the road surface.

11. The method of claim 1, wherein the original intensity map is obtained by mapping three-dimensional points in a point cloud to the original elements.

12. A device for performing recognition related to a road surface, the device comprising:
one or more processors;
memory storing instructions configured to, when executed by the one or more processors, cause the one or more processors to:
obtain an original intensity map comprising original elements having respective signal intensities with respect to a road surface, the signal intensities based on sensing of a vision sensor arranged on a moving object, wherein each of the original elements has a respective local neighborhood of neighboring original elements,
generate a local intensity map by determining local values respectively corresponding to the original elements of the original intensity map, wherein the local values are determined based on the original elements in the respectively corresponding local neighborhoods,
generate a normalized intensity map by normalizing the original intensity map based on the local intensity map, and
perform recognition related to the road surface based on the normalized intensity map, wherein the instructions are further configured to cause the one or more processors to:
obtain a first recognition result based on sensing data on a first time point;
obtain a second recognition result based on sensing data on a second time point; and
calculate movement information on movement of the moving object between the first time point and the second time point, based on a match between the first recognition result and the second recognition result, wherein the movement information includes translation information and rotation information.

13. The device of claim 12, wherein the local neighborhood of an original element is determined based on including therein original elements within a given distance of the original element.

14. The device of claim 13, wherein the instructions are further configured to cause the one or more processors to
determine valid original elements in the local neighborhood, and
compute a local value based on the number of determined valid elements in the local neighborhood or an element value of a determined valid element.

15. The device of claim 12, wherein the instructions are further configured to cause the one or more processors to normalize an original element of the original intensity map to a ratio of an element value of the original element to a local value derived from the local neighborhood of the original element.

16. The device of claim 12, wherein the instructions are further configured to cause the one or more processors to detect a road surface marking by comparing the generated normalized intensity map to a threshold.

17. The device of claim 12, wherein the instructions are further configured to cause the one or more processors to, when receiving additional sensing data, update the original intensity map based on the additional sensing data.

18. The device of claim 12, wherein the instructions are further configured to cause the one or more processors to detect a lane line or a crosswalk based on the recognition related to the road surface.

* * * * *